United States Patent Office 3,711,322
Patented Jan. 16, 1973

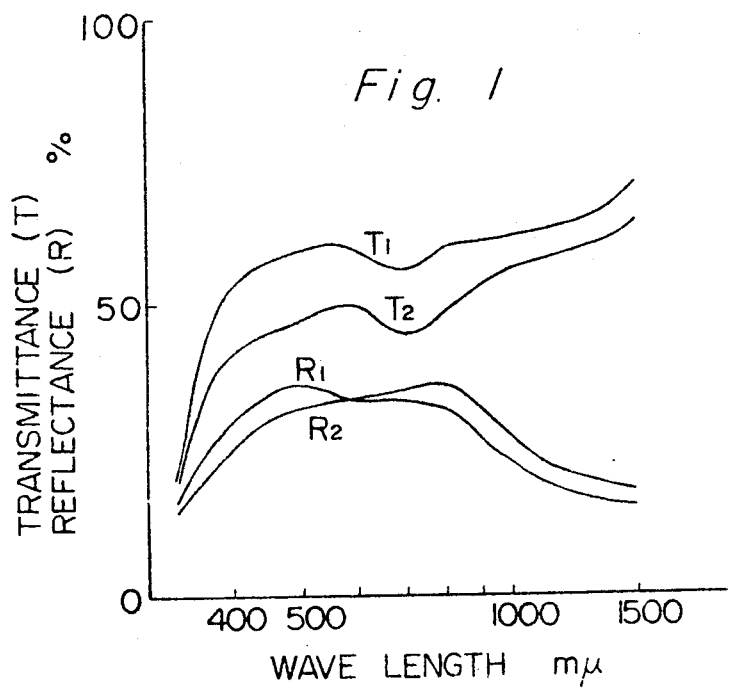
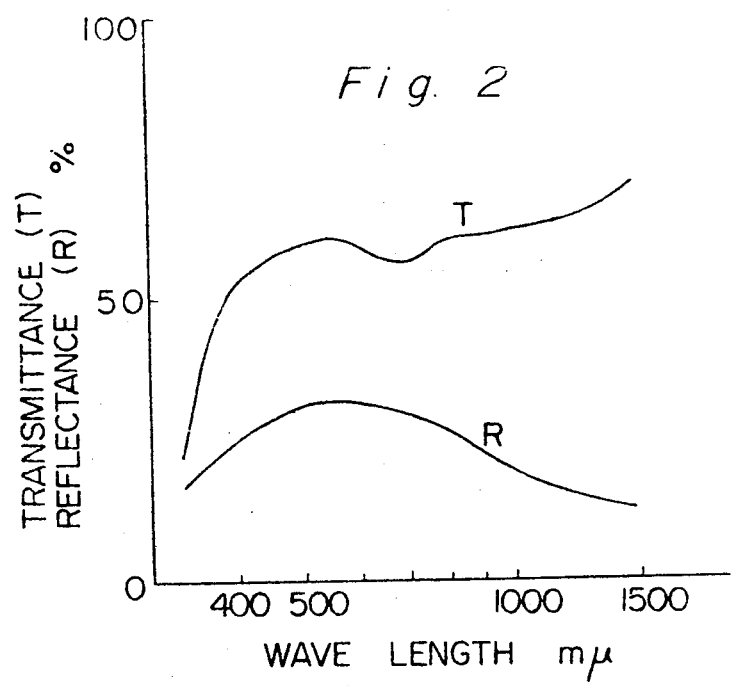

3,711,322
GLASS HAVING SEMITRANSPARENT COLORED COATING
Akira Kushihashi, Nishinomiya, and Naoyoshi Yamada, Itami, Japan, assignors to Nippon Sheet Glass Co., Ltd., Osaka, Japan
Filed July 6, 1970, Ser. No. 52,254
Int. Cl. C03c 17/26
U.S. Cl. 117—124 A       5 Claims

ABSTRACT OF THE DISCLOSURE

A glass substrate having a thin semitransparent film of metal oxides thereon, said film containing oxides of (a) at least one of cobalt, chromium and iron, and (b) at least one of calcium and magnesium.

---

This invention relates to colored glass having on the surface thereof a semitransparent coating of a colored metal oxide and to a process for the preparation of the same. More detailedly, the invention relates to colored glass having a semi-transparent coating film of colored metal oxide which possesses uniform optical characteristics throughout a desired portion of the surface of the glass, and to a process for the preparation of such colored glass.

Coated glass sheets having a colored, semitransparent coating film of a metal oxide on the surface thereof have been heretofore prepared by a method comprising heating a glass sheet at a prescribed temperature, for instance, 400–750° C. in a heating furnace, spraying a solution of a compound of a metal such as cobalt, chromium and iron onto the surface of the heated glass sheet and thermally decomposing the metal compound applied to the glass sheet, or by a method comprising heating a glass sheet at a prescribed temperature, for instance, 400–750° C. in a heating furnace, dipping the heated glass in a solution of a compound of a metal such as mentioned above and thermally decomposing the metal compound applied to the glass sheet.

In accordance with these conventional methods, however, it is impossible to obtain a coated glass sheet having a uniform coating film throughout the coated surface thereof, when variation in temperature is caused to occur depending on portions of the heated glass during the thermal decomposition of the metal compound. Further, even if the glass sheet is uniformly heated, since the marginal portion of the glass sheet is cooled more quickly than the central portion, the degree of coloration is lower in the marginal portion than in the central portion, with the result that the color of the marginal portion is fainter than that of the central portion.

Unexpectedly, it has now been found that when a compound of a metal selected from the group consisting of calcium and magnesium is applied to the surface of a glass sheet together with the above-mentioned compound of a metal selected from the group of cobalt, chromium and iron, a semi-transparent, colored metal oxide coating having uniform optical characteristics throughout a desired portion of the glass surface can be formed regardless of variation in temperature of the surface of the glass sheet during the step of forming the coating film.

Accordingly, the primary object of the invention is to provide glass having a semitransparent, colored metal oxide coating film which possesses substantially uniform optical characteristics throughout a desired portion of the surface of glass.

The invention will now be described in detail with reference to the accompanying drawing, in which FIGS. 1 and 2 are graphs of the spectral transmittance and spectral reflectance of specific glasses according to the invention.

In accordance with this invention, there is provided an improvement of the process for the preparation of colored glass comprising applying to the surface of glass a solution of at least one compound (a) of a metal selected from the group consisting of cobalt, chromium and iron, capable of being thermal decomposed to the metal oxide by heating in an oxygen-containing atmosphere, and thermally decomposing said compound (a) to thereby form a seimtransparent, colored metal oxide coating film on the surface of the glass; said improvement being characterized in that at least one compound (b) of a metal selected from the group consisting of calcium and magnesium, capable of being thermally decomposed to the metal oxide by heating in an oxygen-containing atmosphere, is applied together with said compound (a) to the glass surface in an amount of 5–40% by weight based on the sum of metal compounds (a) and (b), reckoned as metal oxides.

This invention is applicable to various glass substrates such as sheet glass, glass fiber, glass vessels, glass tubes, glass lenses and other articles of glass of various shapes. The kind of glass is not critical in this invention and the invention is applicable to any known soda-lime glass, silicate glass, lead glass, boro-silicate glass and alumina-silicate glass. This invention is particularly useful for the manufacture of semitransparent, colored, heat ray reflecting glass sheet, and hence, is advantageously applicable particularly to sheet glass.

As the coating solution to be applied to the glass surface, there is used a solution containing a combination of:

(a) a compound of a metal selected from the group consisting of cobalt, chromium and iron, capable of being thermally decomposed to the metal oxide by heating in an oxygen-containing atmosphere, and
(b) a compound of a metal seelcted from the group consisting of calcium and magnesium, capable of being thermally decomposed by heating in an oxygen-containing atmosphere.

As metal compounds (a) and (b), any metal compound that can be thermally decomposed at temperatures lower than the softening point of glass to give a film of an oxide of the metal may be used in this invention. The softening point of glass varies depending on the kind of glass, but in the case of sheet glass, generally, the softening point is about 730° C. Any of the inorganic compounds such as carbonates, nitrates, acetates and chlorides of the above-mentioned metals and organic compounds thereof may be used in this invention, so far as they are thermally decomposed at temperatures lower than the softening point of glass to give the metal oxide film.

In order to achieve an object of forming a colored metal oxide coating film having as uniform optical characteristics as possible throughout the coated surface of the glass substrate, however, it is preferable to use organic compounds of the above-mentioned metals, particularly those consisting of the metal element and carbon and hydrogen atoms, or the metal element and carbon, hydrogen and oxygen atoms.

In a particularly preferable embodiment of this invention, the compound (a) is (i) a beta-diketone complex, (ii) a beta-ketonic acid ester complex or (iii) a cyclopentadienyl compound of a metal selected from the group consisting of cobalt, chromium and iron, and the compound (b) is (i) a beta-diketone complex, (ii) a beta-ketonic acid ester complex or (iii) a cyclopentadienyl compound of a metal selected from the group consisting of calcium and magnesium.

As beta-diketone complexes and beta-ketonic acid ester complexes, there may be used those expressed by the formula

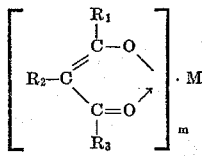

wherein $R_1$ is an alkyl, aryl or aralkyl group,
$R_3$ is an alkyl, aryl, aralkyl or alkoxy group,
$R_2$ is a hydrogen atom or an alkyl, aryl or aralkyl group,
M is cobalt, chromium, iron, calcium or magnesium, and
$m$ is a number corresponding to the valance of the metal M.

Among the complexes expressed by the above formula, the following are particularly preferred:

Cobalt (II) acetylacetonate,
Cobalt (III) acetylacetonate,
Cobalt (III) ethyl acetoacetate chelate,
Chromium (III) acetylacetonate,
Chromium (III) ethyl acetoacetate chelate,
Iron (III) acetylacetonate,
Iron (III) ethyl acetoacetate chelate,
Calcium acetylacetonate,
Calcium ethyl acetoacetate chelate,
Magnesium acetylacetonate, and
Magnesium ethyl acetoacetate chelate.

As cyclopentadienyl compounds there may be used compounds expressed by the formula

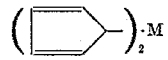

wherein M is cobalt, chromium, iron, calcium or magnesium;

monocyclopentadienyl compounds such as $$Co(C_2H_5)(CO)_2$$

$Cr(C_2H_5)(CO)_3H$ and $Fe(C_2H_5)(CO_2)Na$; and binuclear complexes such as $(C_5H_5)Cr(CO)_6Cr(C_5H_5)$ and $(C_5H_5)Fe(CO)_4Fe(C_5H_5)$.

The prominent feature of this invention is that the compound (a) of a metal selected from the group consisting of cobalt, chromium and iron and the compound (b) of a metal selected from the group of calcium and magnesium are applied to the surface of the glass substrate in such proportions that the amount of the compound (b) is 5–40% by weight, preferably 10–25% by weight, based on the sum of compounds (a) and (b), reckoned as metal oxides. In case the proportion of the calcium compound and/or the magnesium compound is below range, the object of making the optical characteristics of the colored metal oxide coating uniform throughout the coated glass surface cannot be attained. If the proportion of the calcium and/or the magnesium compound is above the said range, there is caused to appear a tendency that the color tone of the metal oxide coating film is too faint, or the physical and chemical durabilities of the coating are lowered.

In accordance with this invention, the compounds (a) and (b) may be applied to the surface of the glass substrate in the form of a solution formed by dissolving these compounds in an optional solvent capable of dissolving them commonly. For instance, in case both compounds (a) and (b) are organic compounds, organic solvents such as lower alcohol, e.g., methanol and ethanol, aromatic hydrocarbons, e.g., benzene, toluene and xylene, and ethers are used. It is preferable that the concentration of the metal compounds in the coating solution is such that one application to the glass substrate will be sufficient to form a desired semi-transparent, colored metal oxide coating film. In view of the foregoing, it is preferable that the concentration of the metal compounds in the coating solution is in the range of from 5 to 40%, especially from 10 to 20%.

The application of the above compounds (a) and (b) may be performed by a customary method, for instance, dip-coating and spray-coating methods. The application of a solution of the metal compounds and the thermal decomposition of the metal compounds may be conducted either coincidentally or separately. For instance, the thermal decomposition may be performed coincidentally with the application of a solution of the metal compounds by applying the solution of the metal compounds directly to the surface of a glass substrate heated to a temperature lower than the softening point of the glass but higher than any of the decomposition points of the metal compounds. Further, the thermal decomposition of the metal compounds may be accomplished also by applying a solution of the metal compounds to the surface of a glass substrate and then heating the coated glass substrate at the above-mentioned temperature. In this invention it is also possible to apply a solution of the compound (a) and a solution of the compound (b) separately.

The solution of the metal compounds is applied to the surface of a glass substrate in an amount sufficient to give a semitransparent, colored thin film of oxides of the metals on the surface of the glass substrate after the thermal decomposition of the metal compounds. Since the semi-transparent film generally exhibits a visible ray transmittance ranging from 15% to 70%, in this invention it is desired that the solution of the metal compounds be applied to the surface of a glass substrate in an amount sufficient to give a thin film of oxides of the metals having a thickness of 0.01 to 0.1 micron.

The metal compounds applied in the form of a solution to the surface of a glass substrate are heated, preferably at 400–750° C., in an atmosphere containing oxygen, whereby a colored thin film of oxides of the metals is formed on the surface of the glass substrate.

Thus, in accordance with this invention there is provided a novel glass comprising a glass substrate and a semi-transparent, thin film of metal oxides of a thickness of 0.01 to 0.1 micron coated on at least one surface of the glass substrate, said semi-transparent, thin film of metal oxides consisting essentially of oxides of (a) at least one metal selected from the group consisting of cobalt, chromium and iron and of (b) at least one metal selected from the group consisting of calcium and magnesium, said metal (b) being present in the semi-transparent, thin film in an amount of 5 to 40% by weight, preferably 10 to 25% by weight, based on the sum of metals (a) and (b), reckoned as metal oxides.

By the presence of the above-mentioned semi-transparent, colored thin film consisting essentially of oxides of metals (a) and (b) formed in situ on the surface of glass, the novel glass of this invention can have the specific feature that its optical characteristics such as visible ray transmittance and reflectivity are substantially uniform throughout the coated surface, though the reason has not been fully understood.

As the metal (a) there may be used a combination of to or more metals selected from cobalt, chromium and iron. Similarly, as the metal (b) there may be used a combination of calcium and magnesium. Oxides of these metals may be present in the semi-transparent thin film in the form of a mixture of an oxide of the metal (a) and an oxide of the metal (b) or of a compound of the metals (a) and (b), or they may be in the form of a mixture of the foregoing. In the case of an oxide of chromium, for instance, it is construed that the chromium oxide is present in the form of a compound with an oxide having a higher alkalinity, such as oxides of calcium, magnesium, cobalt or iron.

In one embodiment of this invention there is provided a colored glass having a semi-transparent, colored thin film of a bronze color consisting essentially of oxides of iron, chromium and calcium in which these oxides are present in the thin film at an iron oxide: chromium oxide: calcium oxide weight ratio of 22-55:35-48:10-30. This colored glass having a semitransparent thin film of a bronze color is excellent as compared to conventional colored glasses of the same color in respect to color distinctness, uniformity in visible ray transmittance, adhesion strength of the semi-transparent thin film and weatherability (such as resistance against solarization). This colored glass is also characterized in that variation in color density is less than in the conventional colored glasses.

In another embodiment of this invention, there is provided a colored glass of a distinct green color. As the coating film exhibiting a greenish color there has been known a thin film composed of an oxide of chromium or nickel. However, these conventional products are defective in that the color tone is unclear and variation in color density is extreme, and since only a colored glass of an extremely faint color is obtained according to the conventional techniques, there has been provided little colored glass of a greenish color which can be put to practical use.

In accordance with this invention, there are provided a glass having a distinctly green thin film free of variation in color density in which the above-mentioned defects of the conventional products are all overcome and which has excellent heat ray reflecting ability, adhesion strength and weatherability (such as resistance against solarization), and a process for the preparation of such colored glass.

In the glass having a semitransparent, thin film of a green color according to this invention, the semitransparent thin film of metal oxides consists essentially of:

(1) picrochromite and cobalt chromite,
(2) picrochromite, cobalt chromite and calcium chromite, or
(3) calcium chromite and cobalt chromite.

Of course, in any of the above-centioned combinations, it is essential that the amount of the calcium and/or magnesium metals should be within the above-mentioned specific range, namely, from 5 to 40% by weight based on the sum of metals present in the thin film, reckoned as oxides.

The above-mentioned glass having a semitransparent thin film of a green color may be prepared in accordance with the process detailed hereinabove by employing a coating solution containing:

(1') a magnesium compound, a chromium compound and a cobalt compound, each of which is capable of being thermally decomposed to give an oxide,
(2') a magnesium compound, a calcium compound, a chromium compound and a cobalt compound, each of which is capable of being thermally decomposed to give an oxide,
(3') a calcium compound, a chromium compound and a cobalt compound, each of which is capable of being thermally decomposed to give an oxide.

Beta-diketone complexes of these metals are particularly suitable as compounds of these metals. In case the thermal decomposition of the metal compounds is effected, preferably above 500° C., a coating film of a distinct green color can be formed on the glass surface. At a decomposition temperature above 650° C., a coating film of a more distinct green color can be obtained. The coating film provided according to this embodiment of this invention is far more excellent than the conventional greenish coating composed merely of an oxide of cobalt or an oxide of chromium or a mixture thereof in the following respects; since the metal oxides are tightly bonded to glass-constituting silicon, adhesion of the coating film to the glass surface is extremely strong; variation in color density is not caused to appear; it exhibits a good heat ray reflecting property and possesses a durable weatherability; and it is highly resistant against chemicals such as acids, alkaline substances, and aqueous solution of sodium chloride.

In the above coating film (1), it is believed that picrochromite and cobalt thromite together form a solid solution, and the coating film (1) is particularly good with respect to distinctness of green color and durability. The coating film (2), namely the coating film consisting of a solid solution of picrochromite and cobalt chromite, and calcium chromite, is advantageous over the coating film (1) in that a coating film of a distinct green color is obtainable at a relatively low temperature.

This invention will now be described in greater detail by referring to non-limitative examples.

EXAMPLE 1

A sheet of glass 30 cm. x 30 cm. x 0.5 cm. was washed and dried, and then heated at 650° C. in a heating furnace for 5 minutes. The sheet of glass was taken out of the heating furnace and immediately an organic metal salt solution consisting of 4% by weight of iron acetylacetonate, 6% by weight of chromium acetylacetonate, 3% by weight of calcium acetylacetonate and 87% by weight of benzene as solvent was sprayed on the surface of the heated sheet of glass by means of a spray gun. The amount of calcium in the solution was 24% by weight based on the sum of metals, reckoned as oxides. During the spraying procedure, the temperature difference between the central portion and marginal portion of the sheet of glass was about 25° C. The coated sheet of glass exhibited a bronze color and an average visible ray transmittance of the sheet of glass was 48%. The difference of the visible ray transmittance between the central portion and marginal portion of the resultant colored sheet of glass was about 3%. The spectral reflectance at 900 m$\mu$ was about 34%.

Under the same conditions as above, a metal-oxide coating film was formed on the surface of a sheet of glass by employing, instead of the above organic metal solution, a solution free of calcium acetylacetonate but containing 4% by weight of iron acetylacetonate and 6% by weight of chromium acetylacetonate. The resulting sheet of glass exhibited a bronze color and its average visible ray transmittance was 50%. The difference of the visible ray transmittance between the central portion and marginal portion of the sheet glass was about 6%.

From the foregoing it can be understood that the sheet of glass having a metal oxide coating film obtained by the metal salt solution containing calcium acetylacetonate is characterized by less difference in the visible ray transmittance between the central portion and marginal portion of the sheet of glass and hence, is excellent in that the degree of formation of the metal oxide coating is substantially uniform throughout the surface of the glass; and that the average visible ray transmittance and heat ray reflecting property of the above sheet of glass are comparable to those of the sheet of glass having a metal oxide coating film obtained by employing a metal salt solution free of calcium acetylacetonate and the former sheet of glass is rather excellent in respect of variation of color density as compared with the latter sheet of glass.

EXAMPLE 2

In the same manner as in Example 1, a sheet of glass 30 cm. x 30 cm. x 0.5 cm. was washed and dried, and then heated at 650° C. for 5 minutes in a heating furnace. The sheet of glass was taken out of the heating furnace, and immediately an organic metal salt solution consisting of 8.9% by weight of cobalt acetylacetonate, 2.1% by weight of magnesium acetylacetonate and as solvent, 44.5% by weight of benzene and 44.5% by weight of methyl alcohol was sprayed on the surface of the sheet of glass by means of a spray gun. The amount of magnesium in the solution was 13% by weight based on the sum of the metals, reckoned as oxides. During the spraying procedure, the temperature difference between the central portion ad marginal portion of the sheet of glass was about 20° C. The resulting sheet of glass having a metal oxide coating film exhibited a brown color and the average visible ray transmittance was 36%. The difference of the visible ray transmittance between the central portion and marginal portion of the resulting colored glass was about 2.9%. An average spectral reflectance at 900 m$\mu$ was about 38%.

Under the same conditions as above, a sheet of glass having a metal oxide coating film was prepared by employing a metal salt solution free of the magnesium salt but containing 8.9% by weight of cobalt acetylacetonate. The resulting sheet of glass exhibited a brown color and its average visible ray transmittance was 39%. The difference of the visible ray transmittance between the central portion and marginal portion of the sheet of glass was about 5%. The spectral reflectance at 900 m$\mu$ was 39%.

From the foregoing results it can be seen that in the sheet of glass having a metal oxide coating film obtained by employing the solution containing magnesium acetylacetonate the difference of the visible ray transmittance between the central portion and marginal portion is small and the degree of formation of the coating film is substantially uniform throughout the surface of the sheet of glass; and that the above sheet of glass is comparable to a glass sheet having a metal oxide coating obtained by employing the solution free of magnesium acetylacetonate with respect to the average visible ray transmittance and the heat ray reflecting property.

EXAMPLE 3

In a sheet glass manufacturing apparatus, a metal salt solution consisting of 2.2% by weight of magnesium acetylacetonate, 7.2% by weight of chromium acetylacetonate, 2.6% by weight of cobalt acetylacetonate and 88% by weight of benzene was sprayed on the surface of an ordinary transparent glass ribbon maintained at 650° C. in an annealing lehr by means of a spray gun running in the lateral direction of the glass ribbon. The amount of magnesium in the solution was 15% by weight based on the sum of the metals, reckoned as oxides.

The glass ribbon was cut into a sheet of a desired length after it had passed through the annealing lehr. The coating film of the resulting sheet of glass exhibited a distinct green color, and as a result of electron diffraction analysis it was determined that a thin film of about 0.06$\mu$ composed of picrochromite and cobalt chromite was formed on the glass surface. It was believed that these oxides formed a solid solution.

As is apparent from FIG. 1 where curves of spectral transmittance ($T_1$) and spectral reflectance ($R_1$) of the resulting sheet of glass are shown, the glass sheet is characterized by the following optical properties: a visible ray transmittance of 50–60%, and a solar energy reflectance of 29%. The dominant wavelength of the sheet was 564 m$\mu$ and the excitation purity was 3%.

EXAMPLE 4

An ordinary transparent sheet glass of 30 cm. x 30 cm. x 0.5 cm. was washed and dried, and then heated at 550° C. for 4 minutes. Immediately, a metal salt solution consisting of 1.1% by weight of magnesium acetylacetonate, 1.5% by weight of calcium acetylacetonate, 7.2% by weight of chromium acetylacetonate, 2.4% by weight of cobalt acetylacetonate and 87.8% by weight of benzene was uniformly sprayed on the surface of the heated glass. The amount of magnesium and calcium was 20% by weight based on the sum of the metals, reckoned as oxides. The coating film on the resulting sheet of glass exhibited a distinct green color and had a thickness of about 0.04$\mu$. As a result of electron diffraction analysis, it was believed that the coating film was composed of a picrochromite/cobalt chromite solid solution, and cobalt chromite and calcium chromite. The optical properties of the resulting sheet of glass are shown in FIG. 1 where curves of transmittance ($T_2$) and spectral reflectance ($R_2$) are given.

During the thermal decomposition procedure, the temperature difference was about 20° C. between the central portion and marginal portion of the sheet of glass. In the resulting colored sheet of glass the spectral transmittance to light of a wavelength of 550 m$\mu$ was in the range of 64–65% and a spectral reflectance to the ray of a wavelength of 900 m$\mu$ was in the range of 23.5–24.1% throughout the surface of the sheet of glass. Thus it can be seen that the sheet of glass obtained in this example exhibited substantially uniform optical properties throughout the surface thereof.

EXAMPLE 5

An ordinary transparent sheet of glass 30 cm. x 30 cm. x 0.5 cm. was washed and dried, and then heated at 600° C. for 4 minutes. Immediately, a metal salt solution consisting of 3% by weight of cobalt ethyl acetoacetate, 2.5% by weight of magnesium ethyl acetoacetate, 7% by weight of chromium acetylacetonate and 87.5% by weight of benzene was uniformly sprayed on the surface of the heated sheet of glass by means of a spray gun. The amount of magnesium was 14% by weight based on the sum of the metals, reckoned as oxides.

The coating film on the resulting sheet of glass exhibited a distinct green color and was mainly composed of a solid solution of picrochromite and cobalt chromite.

Film-coated sheets of glass as obtained in Examples 3 to 5 were immersed for 50 hours in 10% oxalic acid aqueous solution 1 N hydrochloric acid at 50° C., and 10% caustic soda aqueous solution at 50° C., respectively, and for 150 hours in hot water at 100° C. In each case, neither degeneration of the coating film nor change in optical properties was observed in any of the sheets of glass. It is thought that such excellent chemical resistance is due to the fact that the coating film is not composed of a mere mixture of metal oxides but composed of picrochromite, and cobalt chromite and/or calcium chromite, the picrochromite forming a solid solution with cobalt chromite.

EXAMPLE 6

An ordinary transparent sheet of glass 30 cm. x 30 cm. x 0.5 cm. was washed and dried, and then heated at 700° C. for 4 minutes. Immediately, a metal salt solution consisting of 3.0% by weight of calcium acetylacetonate, 7.2% by weight of chromium acetylacetonate, 2.2% by weight of cobalt acetylacetonate and 87.6% by weight of methanol was uniformly sprayed on the surface of the sheet of glass by means of a spray gun. The amount of calcium in the solution was 21% by weight based on the sum of the metals, reckoned as oxides. The coating film on the resulting colored sheet of glass exhibited a distinct green color and had a thickness of about 0.05$\mu$. As a result of electron diffraction analysis it was confirmed that the film was composed of calcium chromite and cobalt chromite. Optical properties of the resulting sheet of glass are shown in FIG. 2 where curves of spectral transmittance (T) and spectral reflectance (R) are given. The visible ray transmittance was 58.3% and the solar energy reflectance was 24%. The resulting sheet of glass was also characterized by a dominant wavelength of about 562 m$\mu$ and an excitation purity of 5%.

EXAMPLE 7

In a sheet glass manufacturing apparatus, a metal salt solution consisting of 2% by weight of cyclopentadienyl cobalt, 6% by weight of cyclopentadienyl chromium, 3.5% by weight of calcium ethyl acetoacetate and 88.5% by weight of benzene was uniformly sprayed by means of a spray gun on the surface of an ordinary transparent glass ribbon maintained at about 650° C. in an annealing lehr. The amount of calcium in the solution was 22% by weight based on the sum of the metals, reckoned as oxides. The coating film of the resulting glass ribbon exhibited a distinct green color and was composed mainly of calcium chromite and cobalt chromite.

Each of the glass sheets obtained in Examples 6 and 7 was immersed for 50 hours in 10% oxalic acid aqueous solution at 50° C., 1 N hydrochloric acid at 50° C., and 10% caustic soda aqueous solution at 50° C., respectively, and for 150 hours in hot water at 100° C. In each case no degeneration of the coating film or change of optical properties was observed in either of the sheets of glass. It is thought that such excellent chemical resistance is due to the fact that the coating film was not composed of a mere mixture of metal oxides but was composed of calcium chromite and cobalt chromite.

What we claim is:

1. A transparent glass comprising a transparent glass substrate and a semitransparent thin film of metal oxides of a thickness of 0.01 to 0.1 micron coated on one or both surfaces of the glass substrate, said semitransparent thin film of metal oxides consisting essentially of (a) cobalt chromite, and of (b) at least one oxide selected from the group consisting of calcium chromite and picrochromite, said oxide (b) being present in the semi-transparent thin film in an amount of 5–40% by weight based on the sum of oxides (a) and (b).

2. The glass as described in claim 1 wherein the semitransparent thin film of metal oxides consists essentially of picrochromite and cobalt chromite and said semitransparent, thin film exhibits a green color.

3. The glass as described in claim 1 wherein the semitransparent, thin film of metal oxides consists essentially of picrochromite, cobalt chromite and calcium chromite and said semitransparent, thin film exhibits a green color.

4. The glass as descirbed in claim 1 wherein the semitransparent, thin film consists essentially of calcium chromite and cobalt chromite and said semitransparent, thin film exhibits a green color.

5. A transparent glass comprising a transparent glass substrate and a semitransparent thin film of metal oxides of a thickness of 0.01 to 0.1 micron coated on one or both surfaces of the glass substrate, said semitransparent thin film of metal oxides consisting essentially of iron, chromium and calcium, these oxides being present in the semitransparent, thin film at an iron oxide:chromium oxide:calcium oxide weight ratio of 22–55:35–48:10–30, respectively, and said semitransparent, thin film exhibiting a bronze color.

References Cited

UNITED STATES PATENTS

| 3,096,206 | 7/1963 | Wade | 117—124 A |
| 3,198,167 | 8/1965 | Bakish et al. | 117—107.2 R |

WILLIAM D. MARTIN, Primary Examiner

D. COHEN, Assistant Examiner

U.S. Cl. X.R.

117—33.3